United States Patent
Shin et al.

(10) Patent No.: US 10,574,119 B2
(45) Date of Patent: Feb. 25, 2020

(54) MOUNTING STRUCTURE OF RESOLVER OF MOTOR

(71) Applicants: HYUNDAI MOTOR COMPANY, Seoul (KR); KIA MOTORS CORPORATION, Seoul (KR)

(72) Inventors: Kyungseob Shin, Suwon-si (KR); Dongyeon Han, Seoul (KR); Byungjin Yoo, Asan-si (KR); Hyoungjun Cho, Suwon-si (KR); Sangmo Ryu, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 365 days.

(21) Appl. No.: 15/612,015

(22) Filed: Jun. 2, 2017

(65) Prior Publication Data

US 2018/0145566 A1    May 24, 2018

(30) Foreign Application Priority Data

Nov. 23, 2016  (KR) .......................... 10-2016-0156756

(51) Int. Cl.
*H02K 11/21* (2016.01)
*H02K 11/225* (2016.01)
*F16H 57/031* (2012.01)
*F16H 57/02* (2012.01)

(52) U.S. Cl.
CPC ......... *H02K 11/225* (2016.01); *F16H 57/031* (2013.01); *H02K 11/21* (2016.01); *F16H 2057/02034* (2013.01)

(58) Field of Classification Search
CPC ............................................... H02K 11/21–23
See application file for complete search history.

(56) References Cited

U.S. PATENT DOCUMENTS

2006/0169526 A1* 8/2006 Honbo ................. B62D 5/0403
                                                                          180/444
2009/0224621 A1* 9/2009 Okubo ................... H02K 1/278
                                                                          310/156.25

* cited by examiner

*Primary Examiner* — Ramon M Barrera
(74) *Attorney, Agent, or Firm* — Brinks Gilson & Lione

(57) ABSTRACT

A mounting structure of a resolver of a motor is disclosed. The mounting structure of a resolver of a motor may fix the resolver including a resolver stator and a resolver rotor to a cover of a housing accommodating the motor. The mounting structure may include a resolver cover that is coupled to an edge portion of the resolver stator and press-fitted to a supporting end formed at an inner surface of the cover. In particular, the resolver cover forms a mounting space for mounting a component inside the cover.

9 Claims, 6 Drawing Sheets

MOUNTING STRUCTURE OF RESOLVER OF MOTOR

CROSS-REFERENCE TO RELATED APPLICATION

This application claims priority to and the benefit of Korean Patent Application No. 10-2016-0156756, filed on Nov. 23, 2016, the entire contents of which are incorporated herein by reference.

FIELD

The present disclosure relates to a motor of an electric-powered vehicle. More particularly, the present disclosure relates to a mounting structure of a resolver of a motor.

BACKGROUND

The statements in this section merely provide background information related to the present disclosure and may not constitute prior art.

In general, an environmentally friendly vehicle (a hybrid electric vehicle or an electric vehicle) may generate a driving torque by an electric motor (hereinafter referred to as "drive motor") which gains a rotating force based on electrical energy. A hybrid electric vehicle among the environmentally friendly vehicles includes an electric motor in addition to an engine and a transmission such that the hybrid electric vehicle runs by the electric motor without driving the engine at low speed, and drives the engine with torque assistance of the electric motor when the vehicle speeds up.

The hybrid electric vehicles use the electric motor (it is called a 'motor/generator' in this art) having relatively better low-speed torque characteristics as a main power source at a low-speed and use the engine having relatively better high-speed torque characteristics as a main power source at a high-speed.

However, since the electric motor of the hybrid electric vehicle, different from a motor in general industry filed, shares a transmission housing with the transmission and the engine and is operated at a wide operation region, a length of the hybrid electric vehicle is longer than that of an engine-powered vehicle.

Meanwhile, the electric motor for vehicles is provided with a position sensor such as a resolver for detecting a rotation speed and a rotation position (rotation angle) of a rotor. The resolver used as the position sensor detects an absolute position of the rotor of the motor with an output signal of low AC voltage (about 0.5-5 Vrms).

The resolver includes a resolver stator and a resolver rotor. For example, the rotor of the resolver is mounted at a rotation shaft of the motor and the stator of the resolver is coupled to a cover of the transmission housing by a bolt in the hybrid electric vehicle.

According to conventional arts, a tab is formed at the cover in order to couple the stator of the resolver to the cover of the transmission housing by the bolt. That is, the stator of the resolver is mounted by engaging the bolt into the tab.

Since the resolver is coupled to the cover of the transmission housing by the bolt according to the conventional arts, the cover does not provide a space for mounting components of the transmission. For this reason, an additional housing space for disposing the components of the transmission is to be formed and thus a length of the transmission increases.

The above information disclosed in this Background section is only for enhancement of understanding of the background of the present disclosure and therefore it may contain information that does not form the prior art that is already known to a person of ordinary skill in the art.

SUMMARY

The present disclosure provides a mounting structure of a resolver of a motor having advantages of securing a space for accommodating components of a transmission in a cover of a transmission housing and reducing a length of the transmission.

In one exemplary form of the present disclosure, a mounting structure of a resolver of a motor may fix the resolver including a resolver stator and a resolver rotor to a cover of a housing accommodating the motor. The mounting structure may include: a resolver cover coupled to an edge portion of the resolver stator, press-fitted to a supporting end formed at an inner surface of the cover, and configured to form a mounting space for mounting a component inside the cover.

In the mounting structure of a resolver of a motor, the housing may be a transmission housing and the cover may be a rear cover.

In the mounting structure of a resolver of a motor, the component may be an overdrive brake configured to selectively cut off power of the motor at a high-speed region of a vehicle.

In the mounting structure of a resolver of a motor, the resolver cover may have an annular shape and be coupled to the edge portion of the resolver stator by a bolt.

In the mounting structure of a resolver of a motor, a press-fitted end may be an exterior circumferential edge and be press-fitted to the supporting end of the cover.

In the mounting structure of a resolver of a motor, a coupled end may be an interior circumferential edge and be coupled to the edge portion of the resolver stator by the bolt.

In the mounting structure of a resolver of a motor, the exterior circumferential edge of the resolver cover may be provided with at least one key protruded in a radial direction therefrom.

In the mounting structure of a resolver of a motor, at least one key recess into which the at least one key is inserted may be formed at the supporting end of the cover.

In the mounting structure of a resolver of a motor, oil holes may be evenly formed at the resolver cover along a circumferential direction.

In the mounting structure of a resolver of a motor, straight portions that are evenly spaced apart from each other may be formed at an exterior circumferential edge of the resolver cover.

In the mounting structure of a resolver of a motor, an oil path configured to flow oil therethrough may be formed between at least one straight portion of the straight portions and the supporting end of the cover.

In another form, a mounting structure of a resolver of a motor may fix the resolver including a resolver stator and a resolver rotor to a cover of a housing configured to accommodate the motor, the mounting structure comprises: a supporting end formed at an inner surface of the cover and protruded toward the motor. In particular, an overdrive brake configured to selectively cut off power of the motor is mounted inside the supporting end. The mounting structure further includes: an annular resolver cover coupled to an edge portion of the resolver stator and press-fitted to the supporting end of the resolver cover; a contacting step configured to contact with an exterior circumferential edge of the resolver cover; and at least one tool recess configured to disassemble the resolver cover and formed at the supporting end.

In the mounting structure of a resolver of a motor, the resolver cover may inhibit electromagnetic noise between the supporting end of the cover and the resolver stator from entering to the resolver stator.

In exemplary forms of the present disclosure, a mounting space is provided inside a supporting end by press-fitting a resolver to a supporting end at an inside of a rear cover through a resolver cover, and components of a transmission such as an overdrive brake is mounted in the mounting space.

Since a space for disposing the components of the transmission can be secured at the rear cover of the transmission housing through press-fit of the resolver, a length of the transmission may be reduced in the exemplary forms of the present disclosure.

In the exemplary forms of the present disclosure, electromagnetic noise of a motor stator coil entering a resolver stator may be effectively sheltered by a resolver cover.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
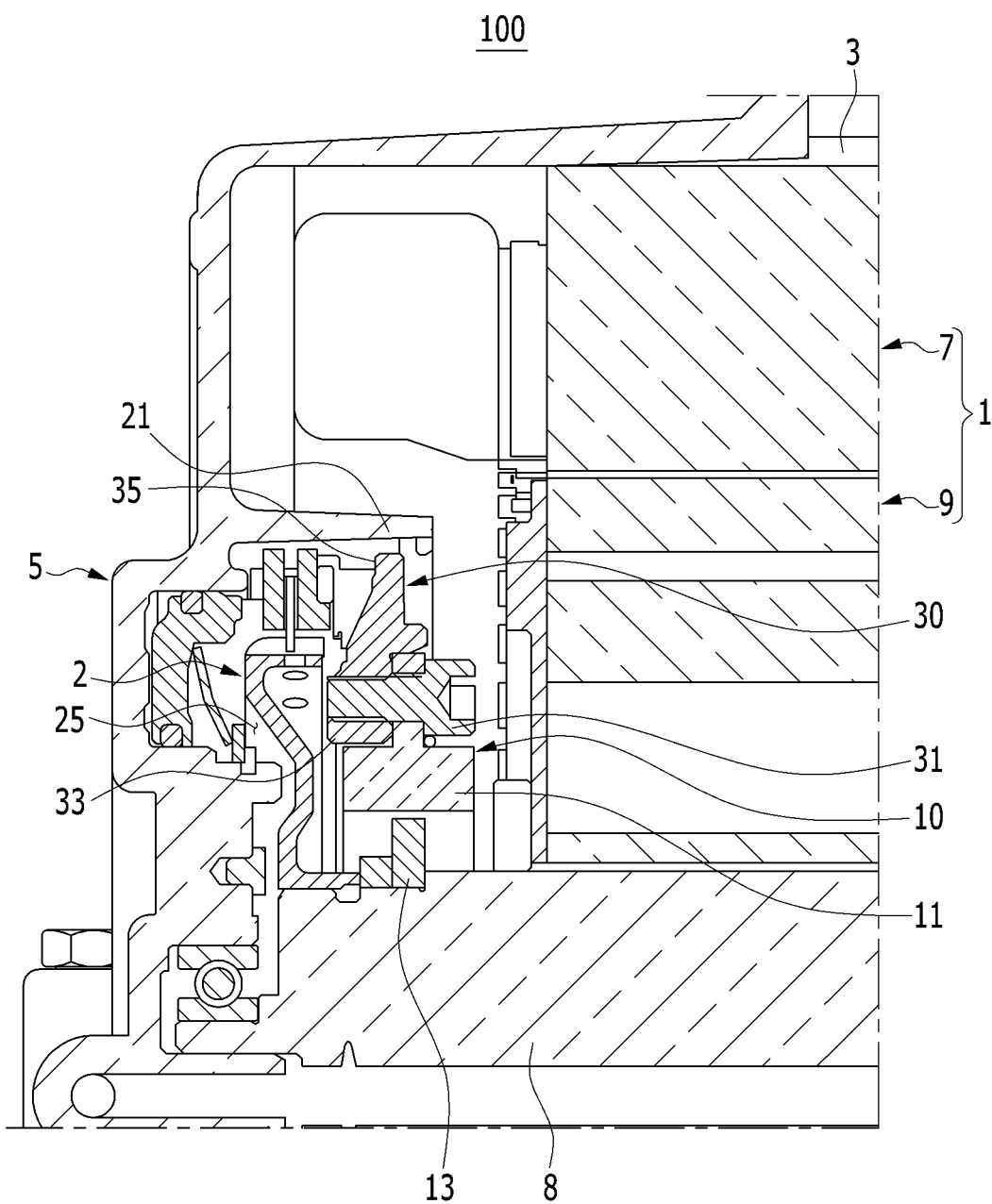
FIG. 1 is a cross-sectional view of a mounting structure of a resolver of a motor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

To describe the present disclosure explicitly, a part which is not related to the description is omitted.

It should be understood that the above-referenced drawings are not necessarily to scale, presenting a somewhat simplified representation of various preferred features illustrative of the basic principles of the present disclosure.

In the following description, dividing names of components into first, second, and the like is to divide the names because the names of the components are the same as each other and an order thereof is not particularly limited.

It will be further understood, unless it is explicitly described to the contrary, that the terms "comprises", "includes", "including" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the term such as " . . . unit", " . . . means", " . . . portion", "module", etc. in the specification means a unit which processes at least one function or one operation.

Figure 2:
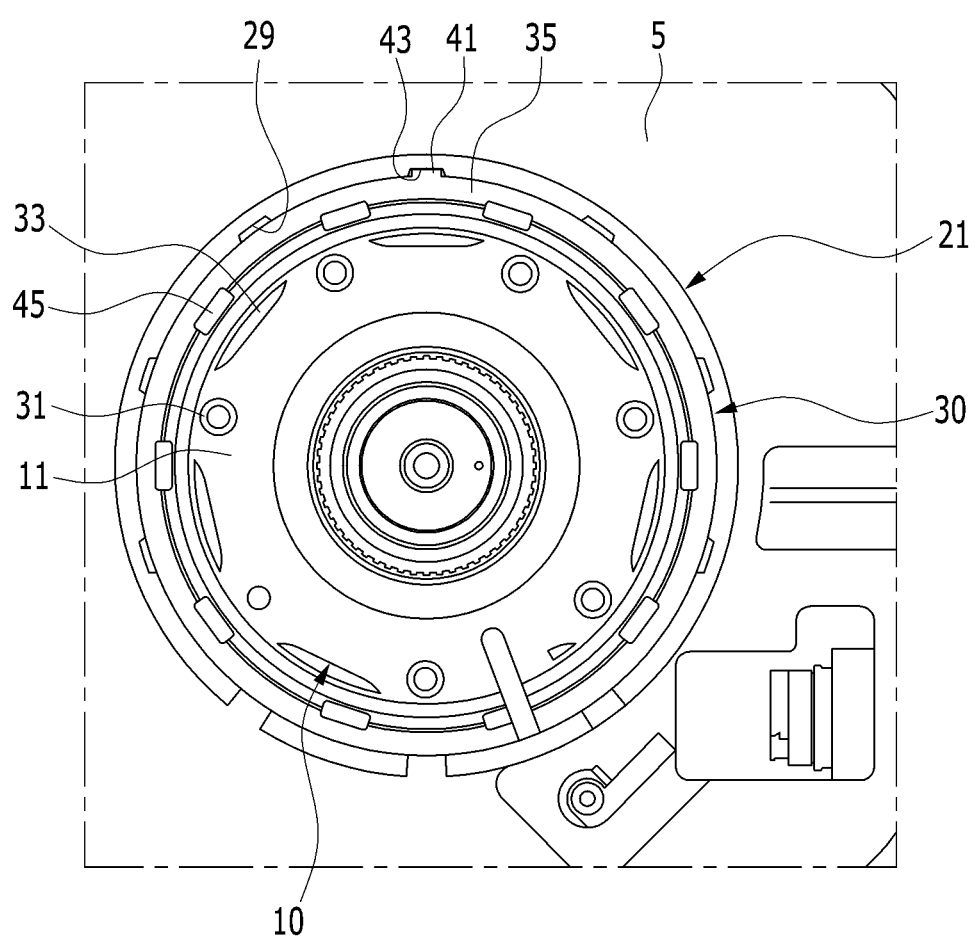
FIG. 2 is a side view of a resolver cover applicable to a mounting structure of a resolver of a motor.

FIG. 1 is a cross-sectional view of a mounting structure of a resolver of a motor in one exemplary form of the present disclosure, and FIG. 2 is a side view of a resolver cover applicable to a mounting structure of a resolver of a motor as an exemplary form of the present disclosure. Here, FIG. 2 is a diagram illustrating the resolver 10 seen from an inner portion of the transmission housing 3.

Referring to FIG. 1 and FIG. 2, a mounting structure 100 of a resolver of a motor is applicable to a transmission of a hybrid electric vehicle (hybrid transmission) using power of an engine and an electric motor (it will be called a 'motor/generator' in this art and will hereinafter be called a "motor" for ease of description).

For example, the motor 1 fixedly mounted inside a housing 3 of the transmission by a support ring, etc. and a rear cover 5 for closing and sealing the motor 1 is coupled to the housing 3 of the transmission.

Further, the motor 1 may include a permanent magnet synchronous motor (PMSM) or a wound rotor synchronous motor (WRSM).

The motor 1 includes a stator 7 fixedly mounted in the transmission housing 3 and generating magnetic flux, and a rotor 9 disposed apart from the stator 7 with a gap and rotating about a rotation shaft 8 as a drive shaft.

Meanwhile, a resolver 10 as a position sensor for detecting a rotation speed and an absolute position of the rotor 9 is mounted in the motor 1. The resolver 10 includes a resolver stator 11, a resolver rotor 13 and a rotating transformer (not illustrated in the drawings).

Since the resolver 10 is a resolver assembly for a motor that is well known to a person skilled in the art, detailed description thereof will be omitted in the present disclosure.

Here, the resolver rotor 13 of the resolver 10 is mounted on the rotation shaft 8 of the motor 1, and the resolver stator 11 of the resolver 10 is fixed to the rear cover 5 of the transmission housing 3.

The mounting structure 100 of a resolver of a motor is configured to attach the resolver stator 11 to the rear cover 5, to secure a space for disposing components of the transmission inside the rear cover 5 of the transmission housing 3, and to reduce a length of the hybrid transmission.

For this purpose, the mounting structure 100 of a resolver of a motor includes a resolver cover 30 coupled to the resolver stator 11 of the resolver 10 and fixed to the rear cover 5 of the transmission housing 3. Herein, an "end" or an "edge" means an end at any side or a portion including the end.

Figure 3:
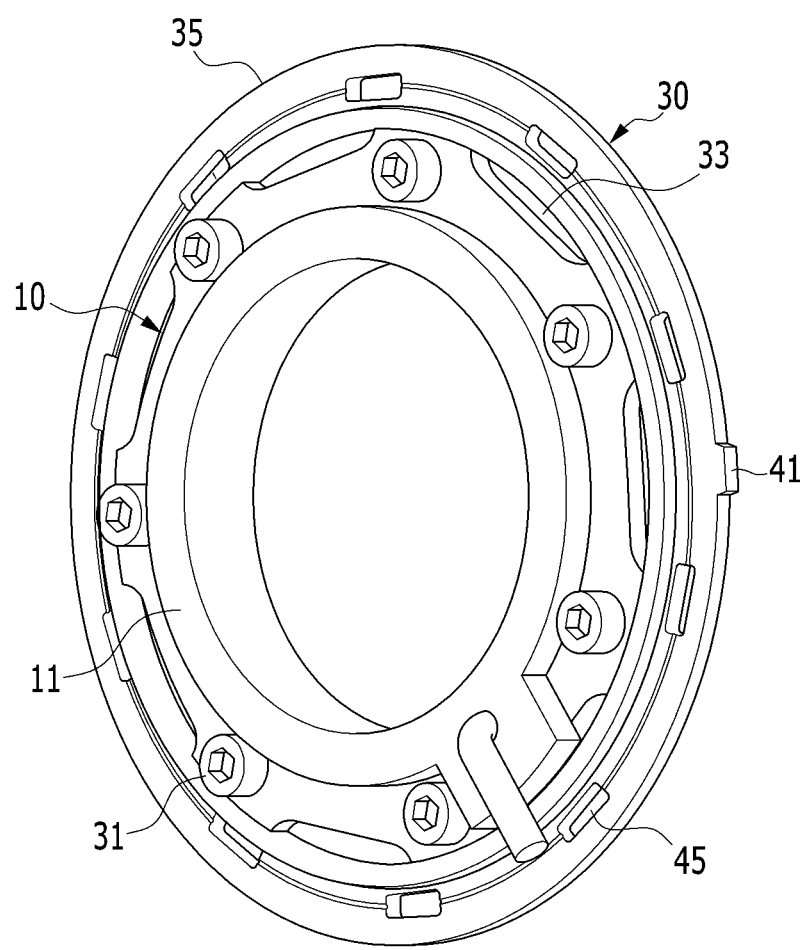
FIG. 3 is a perspective view of a resolver cover applicable to a mounting structure of a resolver of a motor.
Figure 4:
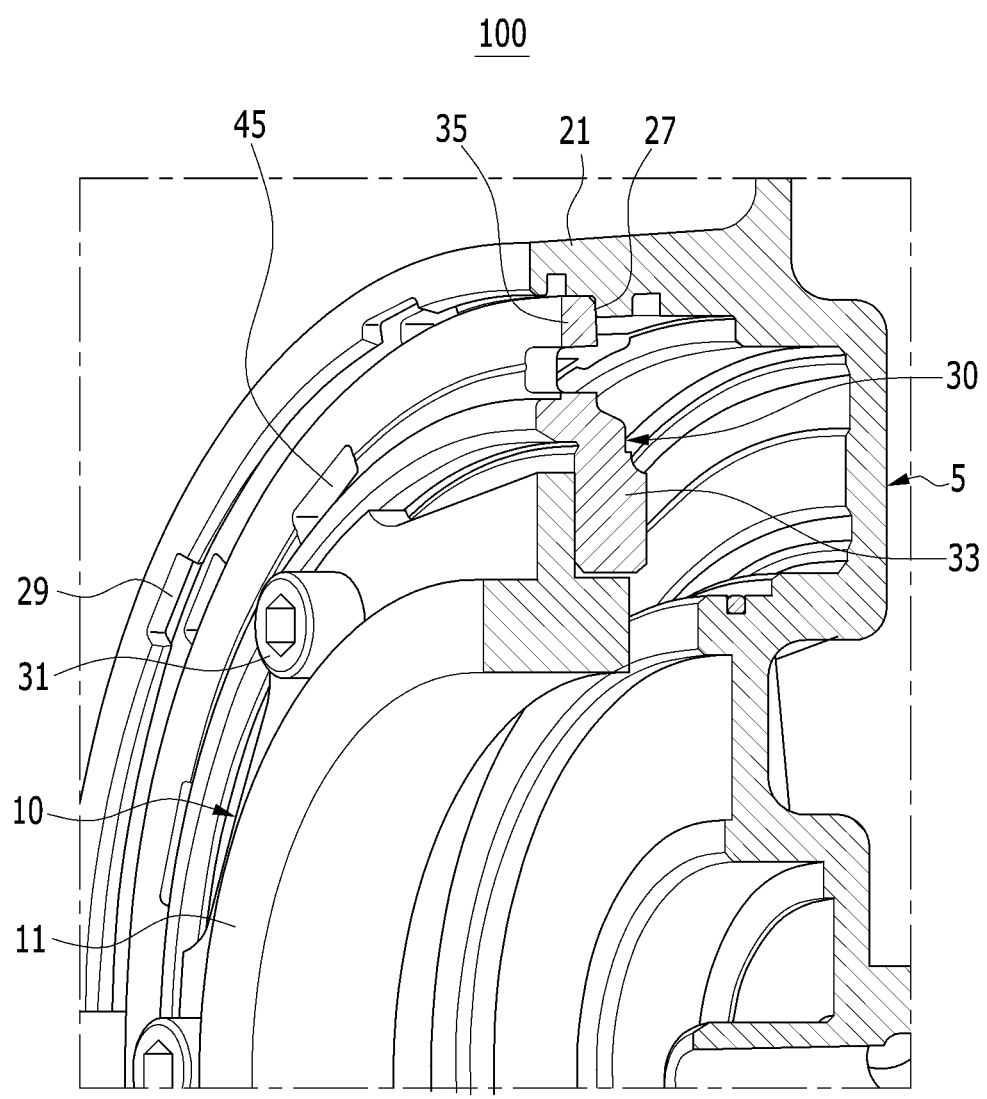
FIG. 4 is a partial perspective cross-sectional view of a resolver cover applicable to a mounting structure of a resolver of a motor.

FIG. 3 is a perspective view of a resolver cover applicable to a mounting structure of a resolver of a motor in one exemplary form of the present disclosure, and FIG. 4 is a partial perspective cross-sectional view of FIG. 3.

Referring to FIG. 1 to FIG. 4, the resolver cover 30 has a ring shape (or disk shape) including an exterior circumferential edge and an interior circumferential edge, and is coupled to an edge portion of the resolver stator 11. The resolver cover 30 is coupled to the edge portion of the resolver stator 11 by a bolt 31.

Since the edge portion of the resolver stator 11 is coupled to the interior circumferential edge of the resolver cover 30 by the bolt 31, the interior circumferential edge of the resolver cover 30 is a coupled end 33 that is coupled to the edge portion of the resolver stator 11 by the bolt.

Meanwhile, a supporting end 21 is protruded from an inner surface of the rear cover 5 toward the motor 1 at an inner side of the transmission housing 3. The supporting end 21 has a cylindrical shape which is protruded from the inner surface of the rear cover 5 along a circumferential direction.

Here, the resolver cover 30 may be press-fitted onto an inner end portion of the supporting end 21 that is protruded in an axial direction. In this case, since the exterior circumferential edge of the resolver cover 30 is press-fitted into the supporting end 21, the exterior circumferential edge is a press-fitted end 35 which is press-fitted to the supporting end 21 of the rear cover 5.

As described above, since the resolver cover 30 is press-fitted to the supporting end 21 at the inner surface of the rear cover 5, the resolver cover 30 may form a mounting space 25 for mounting the components of the transmission at an inner portion of the rear cover 5 and a radial inner portion of the supporting end 21.

According to the exemplary form of the present disclosure, the components of the transmission may include an overdrive brake 2 that is disposed inside the transmission housing 3 and selectively cuts off power of the motor 1. The overdrive brake 2 is configured to cut off the power of the motor 1 in order to use the engine having relatively better high-speed torque characteristics as a main power source at a high-speed region of the vehicle.

A contacting step 27 may be formed at the supporting end 21 of the rear cover 5. The press-fitted end 35 of the resolver cover 30 contacts with the contacting step 27 when press-fit is completed. The contacting step 27 is formed at an interior circumference of the supporting end 21. The press-fitted end 35 of the resolver cover 30 is press-fitted from an end of the supporting end 21 that is protruded in the axial direction to the contacting step 27, and the contacting step 27 supports the press-fitted end 35 of the resolver cover 30.

At least one tool recess 29, as shown in FIG. 2, is formed at the supporting end 21 of the rear cover 5. A tool for disassembling the resolver cover 30 from the supporting end 21 may be inserted into the tool recess 29.

Figure 5:
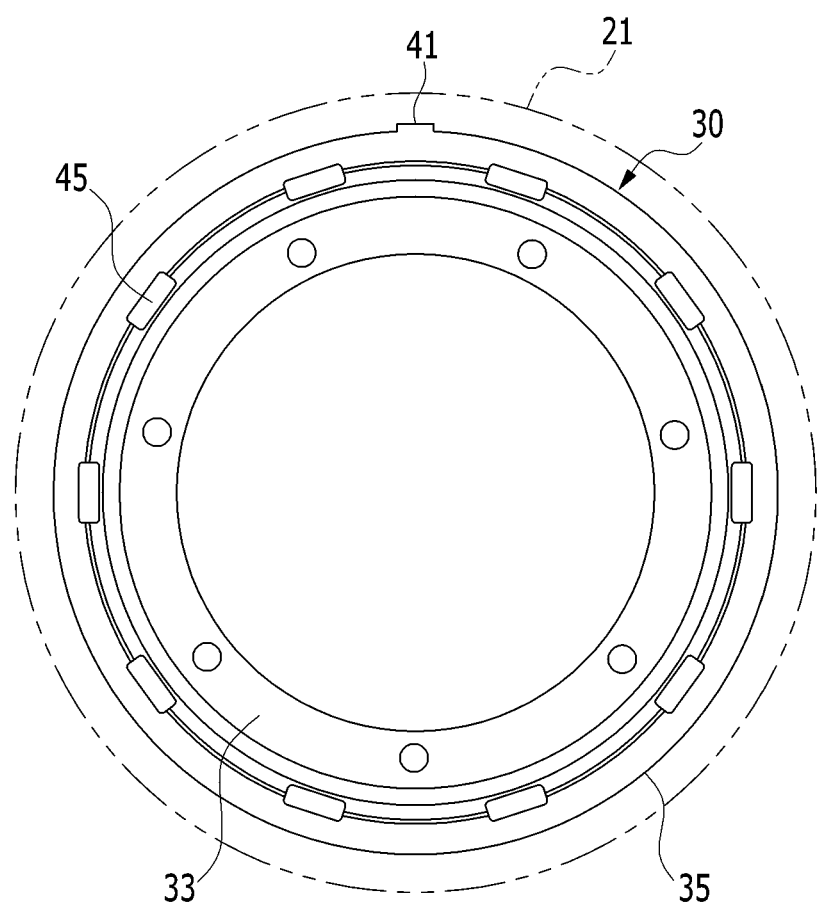
FIG. 5 and FIG. 6 are schematic diagrams of a resolver cover applicable to a mounting structure of a resolver of a motor.

As shown in FIG. 2 and FIG. 5, the resolver cover 30 is provided with the press-fitted end 35 having, for example, a circular shape. The press-fitted end 35 facilitates press-fit of the resolver cover 30 into the supporting end 21. At least one key 41 may be formed at the resolver cover 30. The at least one key 41 is protruded from the press-fitted end 35 in a radial outward direction. In addition, a key recess 43 may be formed at the supporting end 21. The key 41 is fitted into the key recess 43.

The key 41 is inserted into the key recess 43 of the supporting end 21 when the press-fitted end 35 of the resolver cover 30 is press-fitted to the supporting end 21. Key-engagement of the resolver cover 30 and the supporting end 21 aligns a press-fitting position of the resolver cover 30 to the supporting end 21.

In addition, the key-engagement of the resolver cover 30 and the supporting end 21 sets an initial position of the resolver stator 11 when the resolver cover 30 is coupled to the supporting end 21.

Also, oil holes 45 are evenly formed at the resolver cover 30 along a circumferential direction. An oil in the mounting space 25 formed at an interior portion of the supporting end 21 flows into the transmission housing 3 through the oil holes 45.

Figure 6:
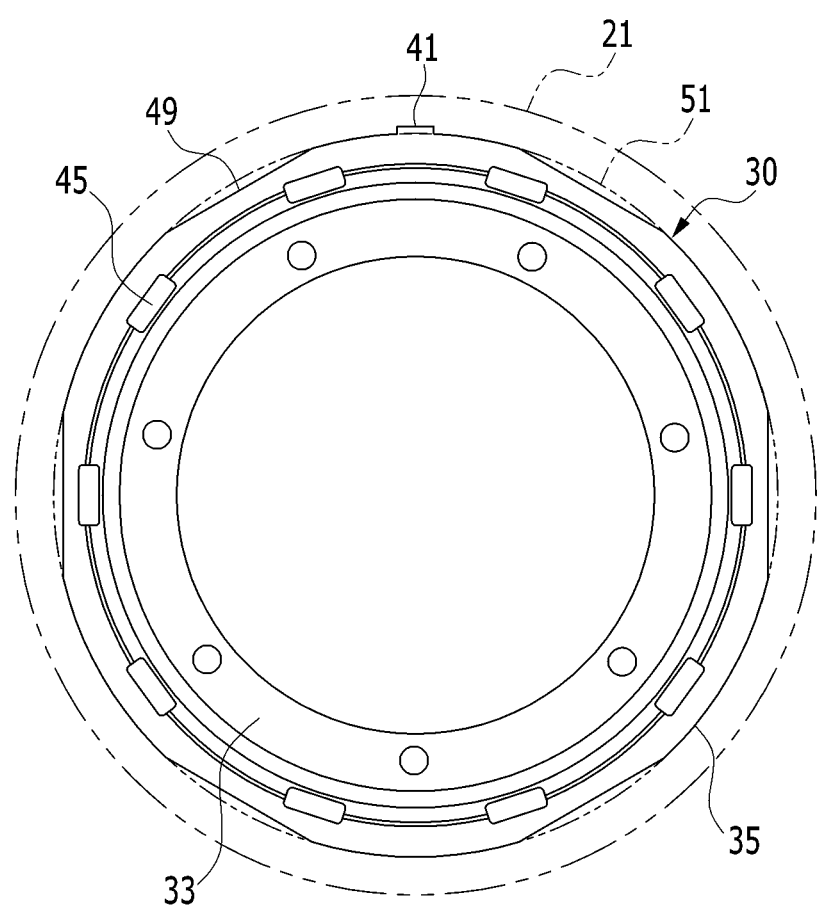

As shown in FIG. 6, the resolver cover 30 in another exemplary form of the present disclosure includes a plurality of straight portions 49 formed evenly at the press-fitted end 35. The straight portion 49 of the press-fitted end 35 does not contact with the supporting end 21, and a portion of the press-fitted end 35 other than the straight portion 49 contacts with the supporting end 21.

Here, an oil path 51 through which the oil flows is formed between the straight portion 49 and the supporting end 21. The oil in the mounting space 25 flows into the transmission housing 3 at the interior portion of the supporting end 21 through the oil path 51 together with the oil holes 45 that are described above. As described above, the key 41 that is inserted into the key recess 43 of the supporting end 21 is formed at the resolver cover 30.

Further, the resolver cover 30 may shelter electromagnetic noise entering the resolver stator 11 between the supporting end 21 of the rear cover 5 and the resolver stator 11.

That is, the resolver cover 30 spaces the resolver stator 11 of the resolver 10 from the stator coil of the motor 1 as long as possible, and shelters the electromagnetic noise of the stator coil of the motor 1 entering the resolver stator 11.

Hereinafter, assembling processes and functions of the mounting structure of a resolver of a motor as one exemplary form of the present disclosure will be described in detail with reference to the accompanying drawings.

Firstly, in a state that the overdrive brake 2 as the components of the transmission is mounted at the inner portion of the supporting end 21 of the rear cover 5, the resolver cover 30 coupled to the resolver stator 11 of the resolver 10 by the bolt 31 is press-fitted to the supporting end 21 as the exemplary form of the present disclosure.

At this process, in a state that the key 41 of the press-fitted end 35 is aligned to the key recess 43 of the supporting end 21, the press-fitted end 35 of the resolver cover 30 is press-fitted to the supporting end 21.

Since the key 41 of the press-fitted end 35 is inserted into the key recess 43 of the supporting end 21, the initial position of the resolver stator 11 and the press-fit position of the resolver cover 30 to the supporting end 21 can be precisely set.

Here, the press-fitted end 35 of the resolver cover 30 is press-fitted from the end of the supporting end 21 protruded in the axial direction to the contacting step 27, and the contacting step 27 supports the press-fitted end 35 of the resolver cover 30.

Meanwhile, since the plurality of oil holes 45 are formed at the resolver cover 30 press-fitted to the supporting end 21, the oil of the mounting space 25 at the inner portion of the supporting end 21 flows into the transmission housing 3 through the oil holes 45.

In addition, since the straight portion 49 is formed at the press-fitted end 35 of the resolver cover 30, the oil path 51 is formed between the supporting end 21 and the resolver cover 30 by the straight portion 49. Therefore, the oil of the mounting space 25 at the inner portion of the supporting end 21 flows into the transmission housing 3 through the oil path 51, thereby further improving cooling performance of the motor 1.

In addition, the electromagnetic noise of the stator coil of the motor 1 is effectively inhibited or prevented from entering the resolver stator 11 by the resolver cover 30.

Further, when the resolver 10 is replaced, the resolver cover 30 may be easily disassembled from the supporting end 21 by the tool inserted into the tool recess 29 of the supporting end 21.

As described above, the mounting structure 100 of a resolver of a motor in the exemplary form of the present disclosure can secure the mounting space 25 at the inner portion of the supporting end 21 by press-fitting the resolver 10 to the supporting end 21 of the rear cover 5 through the resolver cover 30. Therefore, the components of the transmission such as the overdrive brake 2 can be mounted inside the mounting space 25.

Since the space for disposing the components of the transmission can be secured the rear cover 5 of the transmission housing 3 due to press-fit of the resolver in the exemplary form of the present disclosure, the length of the hybrid transmission can be reduced.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A mounting structure of a resolver of a motor that fixes the resolver including a resolver stator and a resolver rotor to a cover of a housing configured to accommodate the motor, the mounting structure comprising:
   a resolver cover coupled to an edge portion of the resolver stator, press-fitted to a supporting end formed at an inner surface of the cover, and configured to form a mounting space for mounting a component inside the cover,
   wherein the housing is a transmission housing and the cover is a rear cover, and
   the component is an overdrive brake configured to selectively cut off power of the motor at a high-speed region of a vehicle.

2. The mounting structure of claim 1, wherein the resolver cover has an annular shape and is coupled to the edge portion of the resolver stator by a bolt.

3. The mounting structure of claim 2, wherein the resolver cover comprises:
   a press-fitted end that is an exterior circumferential edge and is press-fitted to the supporting end of the cover, and
   a coupled end that is an interior circumferential edge and is coupled to the edge portion of the resolver stator by the bolt.

4. The mounting structure of claim 2, wherein an exterior circumferential edge of the resolver cover is provided with at least one key protruded in a radial direction therefrom, and
   at least one key recess into which the at least one key is inserted is formed at the supporting end of the cover.

5. The mounting structure of claim 2, wherein oil holes are evenly formed at the resolver cover along a circumferential direction.

6. The mounting structure of claim 2, wherein straight portions that are evenly spaced apart from each other are formed at an exterior circumferential edge of the resolver cover.

7. The mounting structure of claim 6, wherein an oil path configured to flow oil therethrough is formed between at least one straight portion of the straight portions and the supporting end of the cover.

8. A mounting structure of a resolver of a motor that fixes the resolver including a resolver stator and a resolver rotor to a cover of a housing configured to accommodate the motor, the mounting structure comprising:
   a supporting end formed at an inner surface of the cover and protruded toward the motor, an overdrive brake mounted inside the supporting end and configured to selectively cut off power of the motor;
   an annular resolver cover coupled to an edge portion of the resolver stator and press-fitted to the supporting end of the resolver cover;
   a contacting step configured to contact with an exterior circumferential edge of the resolver cover; and
   at least one tool recess configured to disassemble the resolver cover and formed at the supporting end.

9. The mounting structure of claim 8, wherein the resolver cover is configured to inhibit electromagnetic noise between the supporting end of the cover and the resolver stator from entering to the resolver stator.

* * * * *